UNITED STATES PATENT OFFICE 2,571,118

CARBOXYL-CONTAINING XYLENE-SOLUBLE RESIN

Melvin De Groote, University City, and Bernhard Keiser, Webster Groves, Mo., assignors to Petrolite Corporation, Ltd., Wilmington, Del., a corporation of Delaware No Drawing. Application January 6, 1950, Serial No. 137,293

7 Claims. (Cl. 260—53)

The present invention is concerned with certain new resins derived from mixtures of certain difunctional phenols and salicylic acids, in combination with a reactive aldehyde. More specifically, the invention is concerned with such resins which are characterized by solubility in xylene, as differentiated from polar or oxygenated solvents.

Such resins are particularly valuable as an intermediate raw material for further reaction; for instance, such resins either before or after reaction with a reagent, such as an alcohol, amine or amide, may be subjected to oxyalkylation, particularly oxyethylation, so as to yield surface-active materials. As to surface-active materials, so obtained, by oxyalkylation, and most particularly oxyethylation, see our co-pending application Serial No. 137,292, filed January 6, 1950. Such oxyalkylated derivatives are particularly valuable for breaking petroleum emulsions of the water-in-oil type. As to this particular use, see our copending application Serial No. 137,291, filed January 6, 1950.

Although these materials are resins, we desire to point out that we do not know of any use for such resins in the conventional fields, i. e., as a resin based on some particular mechanical quality, such as hardness, high tensile strength, etc., or based on use in paints, coatings, and the like. For the former use, they lack any valuable characteristics, and for the latter use obviously their high acid value will make them unsatisfactory. These resins are valuable, as far as we know, for one purpose and one purpose only, to wit, raw materials for further chemical reaction.

The production of resins from difunctional hydrocarbon phenols is well known and such resins are important in the art, particularly in the preparation of varnishes or similar coatings. The literature contains references to the preparation of salicylic acid resins. These particular resins, as far as we are aware, have not found any utility whatsoever in any industrial field. We know of no other utility for the resins derived from the mixture herein described other than what is said in the instant application.

For reasons which become obvious, it is believed it may be well to note the preparation of a suitable resin from a hydrocarbon-substituted difunctional monohydric phenol alone, and also a resin made from salicylic acid alone. Certain advantages in manipulation, etc., will become obvious in regard to such instances where a mixture of reactants is employed, as in the instant application, insofar as the present invention is concerned.

Example 1a

|  | Grams |
|---|---|
| Para-tertiary butylphenol | 150 |
| Formaldehyde, 37% | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl acids which serve as catalysts and as emulsifiers particularly in the form of sodium salts, include the following:

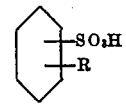

(R is an alkyl hydrocarbon radical having 12–14 carbon atoms.)

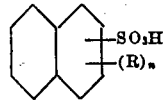

(R is an alkyl radical having 3–12 carbon atoms and $n$ represents the numeral 3, 2, or 1, usually 2, in such instances where R contains less than 8 carbon atoms.)

With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and interchangeable the following specific sulfonic acids, or their sodium salts. A mixture of di- and tripropylated naphthalene monosulfonic acid; diamylated naphthalene monosulfonic acids; and nonyl naphthalene monosulfonic acid.

The equipment used was a conventional two-piece laboratory resin pot. The cover part of the equipment had four openings; one for reflux condenser, one for the stirring device; one for a separatory funnel or other means of adding reactants; and a thermometer well. In the manipulation employed the separatory funnel insert for adding reactants was not used. The device was equipped with a combination reflux and water-trap apparatus, so that the single piece of apparatus could be used as either a reflux condenser or a water trap, depending upon the position of the three-way glass stop-cocks. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot, above described. This particular phenol was in the form of a flaked solid. Heat was applied, with gentle stirring, and the temperature was raised to 80–85° C., at which point a mild exothermic reaction took place. This reaction raised the temperature to approximately 105–110° C. The reaction mixture was then permitted to reflux at 100–105° C. for between one and one and one-half hours. The reflux trap arrangement was then changed from the reflux position to the norman water entrapment position. The water of solution and the water reaction were permitted to distil out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution, so obtained, was used as such in subsequent oxyalkylation steps. We have removed also the solvent by conventional means, such as evaporation, distillation, or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol in presence of a strong mineral acid as a catalyst and using formaldehyde, sometimes yields a resin which apparently has a very slight amount of cross-linking. Such resin is similar to the one described above, except that it is sometimes opaque, and its melting point is higher than the one described above and there is a tendency to cure. Such a resin generally is dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience due to better solubility in xylene, we prefer to use a clear resin, but if desired, either type may be employed. (See Example 1a of our co-pending application Serial No. 8,723, filed February 16, 1948, now Patent 2,499,366, granted March 7, 1950.)

*Example 2a*

| | Grams |
|---|---|
| Salicylic acid (U. S. P. grade) | 150 |
| Formaldehyde, 30% | 75 |
| Water | 200 |
| Concentrated HCl | 5 |

The above ingredients were combined in a conventional glass flask with a stirring device and condenser. The mixture was refluxed for 20 hours at a temperature of approximately 100° C., or slightly in excess thereof. At the end of this time there separated out an aqueous layer and a resinous layer, and the aqueous layer was withdrawn. The non-aqueous layer, which was more or less a solid, was heated to 240°–250° C., during which time the remainder of the water present was eliminated. The resultant resin was clear, brittle and hard. It was not xylene-soluble, but was soluble in a mixture consisting of 50% xylene and 50% diethylene glycol diethylether. (See Example 196a of co-pending application Serial No. 8,723, filed February 16, 1948.)

*Example 3a*

| | Grams |
|---|---|
| Salicylic acid | 150 |
| Hexamethyl tetramine | 34 |
| Alcohol (ethyl) | 400 |

The above mixture was refluxed for 20 hours. At the end of this time the mixture was heated to 150° C. with a distillation of all the alcohol. The resultant product was a dark red hydroscopic resin. This resin was then dissolved in 600 grams of anhydrous methyl alcohol, and 2 grams of para-toluene sulfonic acid added as a catlyst. This mixture was then refluxed for 20 hours. At the end of this time the alcohol was removed along with water of esterification. The resin was dissolved again in another 600-gram lot of methyl alcohol and again refluxed for 20 hours. At the end of this time the alcohol and water were distilled off again and the resin dissolved for a third time in 600 grams of anhydrous methyl alcohol and again refluxed for 20 hours. At the end of this period of time the methanol and water formed were distilled off, yielding the methyl ester in presence of a small amount of sulfonic acid present as a catalyst.

The resin was dark red in color and very soft. It was not soluble in xylene, but 100 grams of resin made a very satisfactory solution with 50 parts of xylene and 50 parts of diethylene glycol diethylether. (See Example 197a of co-pending application Serial No. 8,723, filed February 16, 1948.)

*Example 4a*

| | Grams |
|---|---|
| Salicylic acid (2.0 moles) | 276 |
| Formaldehyde, 37% (2.0 moles) | 162 |
| Concentrated HCl | 3 |
| Monoalkyl ($C_{10}$–$C_{20}$, principally $C_{12}$–$C_{14}$) benzene monosulfonic acid sodium salt | 1 |
| Xylene | 475 |
| Diethylene glycol ether | 50 |

The same procedure was followed as was described under the heading of Example 1a, except that the initial reflux period was 2½ hours, instead of 1½ hours. At the end of this first reflux period there was still a strong odor of formaldehyde present. Two grams more of concentrated hydrochloric acid were added. The mixture was then refluxed for 5½ hours more, at which time there was still a strong odor of formaldehyde present in a sample of the aqueous distillate from the reflux condenser. As a result, 10 more grams of hydrochloric acid were added and the reflux procedure continued for a third period of 17 hours. During this last reflux period the trap arrangement was changed so as to permit the aqueous distillate to distill over and be trapped. This distillate still carried some odor of formaldehyde and there was also some uncombined salicylic acid remaining in the hot solution; probably more than 90%, and possibly 95% of the reactants, entered into the reaction. The salicylic acid remaining in the reaction mass was filtered out hot. On cooling, the solution become thick and syrupy, but was of sufficient solubility and viscosity to be suitable for oxyalkylation. (See Example 198a of aforementioned co-pending application Serial 8,723, filed February 16, 1948.)

*Example 5a*

| | Grams |
|---|---|
| Salicylic acid | 276 |
| HCHO 37% | 162 |
| Water | 600 |
| Xylene | 100 |

The same procedure was followed as in Example 1a, preceding, except that the reflux period was 8 hours. At the end of this time there was still a strong odor of formaldehyde present in the vapors and there was present in the flask unreacted salicylic acid. For this reason another mole of formaldehyde was added (81 grams) and the resinification period repeated for another 8 hours. At the end of this time the water was distilled off along with the unreacted formaldehyde. By the time the water was distilled off, the product was acting like a typical salicylic acid resin, insofar that it began to separate out from the xylene solution. For this reason 50 grams of diethylene glycol diethylether were added and then the mixture distilled so as to remove 50 grams of xylene. When this final product was allowed to cool and stand it remained clear.

Reference is made to the two types of resins which have been previously disclosed, to wit, conventional resins derived from alkylated phenols, which are xylene-soluble, but do not include in the resin molecule a carboxy group for reactions of the kind in which the carboxyl radical is involved, such as esterification, amidification, etc. Likewise, there has been illustrated the salicylic acid resins which are not particularly oil-soluble and are not xylene-soluble, but whose solubility depends upon the addition of a more expensive oxygenated solvent, such as diethylene glycol diethylether, or an alcohol, which, of course, is oxyalkylation-susceptible.

Therefore, in order to prepare the type of materials herein described we have had to prepare a new reactant, to wit, a resin derived from a combination in which salicylic acid and an alkylated phenol are used so as to yield a resin molecule which is xylene-soluble and reactive towards reagents which combine with carboxyl radicals. This aspect of our invention is noted in our co-pending application Serial No. 137,292, filed January 6, 1950.

The value of salicylic acid as a resin-making compound for the production of compounds for use in the present invention rests not so much in the use of the product as such, as in its use in admixture with another phenolic reactant. Thus, if one makes a mixture of approximately 4 moles of para-amylphenol, for example, and one mole of salicylic acid and resinifies the mixture, there are two advantages:

(1) The mixture is soluble, or at least, it can be handled in xylene much more advantageously than resins from salicylic acid alone; and (2) One obtains a resin which has certain possibilities for further reaction which are not present in the usual hydrocarbon-substituted phenol.

In its simplest aspect, it may be represented in an idealized form in the following manner:

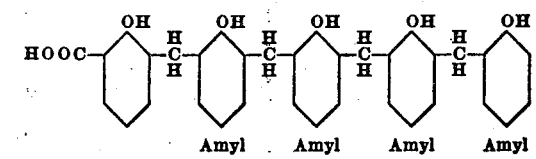

The above formula is, of course, an idealized structure, for obvious reasons, because the salicylic acid nucleus presumably can appear at any point in the resin molecule. Such resin, or for that matter, a resin having an increased number of salicylic acid radicals, can be oxyalkylated in the same manner as other phenol-aldehyde resins.

The reactive carboxyl radical permits a number of variations. Thus, the resin can be reacted with reagents such as ethylene glycol, glycerol, triethanolamine, diethanolamine, etc. (See Example 199a of aforementioned co-pending application Serial No. 8,723, filed February 16, 1948.)

*Example 6a*

| | Grams |
|---|---|
| Salicylic acid | 69 |
| Para-tertiary amylphenol | 328 |
| Monoalkyl ($C_{10}$–$C_{20}$, principally $C_{12}$–$C_{14}$) benzene monosulfonic acid sodium salt | 1.5 |
| Concentrated HCl | 20 |
| Xylene | 400 |
| Formaldehyde | 208 |

The same procedure was followed as in Example 1a, except that the amount of hydrochloric acid employed is comparatively high, to wit, 20 grams, and the reflux time, instead of being 1½ hours, was 3 hours. Only a very small amount of salicylic acid was lost on evaporation. The resin was soft and tacky, and xylene-soluble. (See Example 200a of aforementioned, co-pending application Serial No. 8,723, filed February 16, 1948.)

*Example 7a*

| | | |
|---|---|---|
| Para-tertiary amylphenol (4.0 moles) | grams | 656 |
| Salicylic acid (1.0 mole) | do | 138 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 45% xylene. The solvent-free resin was reddish amber in color, slightly opaque, obviously xylene-soluble, and somewhat hard-to-pliable in consistency.

*Example 8a*

| | | |
|---|---|---|
| Para-tertiary nonylphenol (4.0 moles) | grams | 880 |
| Salicylic acid (1.0 mole) | do | 138 |
| Formaldehyde 37% (5.0 moles) | do | 405 |
| Xylene | do | 600 |
| HCl (concentrated) | ml | 40 |
| Dodecyl toluene monosulfonic acid sodium salt | grams | 3 |

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 38.5% xylene. The solvent-free resin was clear, pale reddish amber in color, xylene-soluble, and soft to semi-pliable in consistency.

Example 9a

Para-tertiary butylphenol (4.0 moles)
grams__ 600
Salicylic acid (1.0 mole) _____do____ 138
Formaldehyde 37% (5.0 moles) _____do____ 405
Xylene _____do____ 700
HCl (concentrated) _____ml__ 40
Dodecyl toluene monosulfonic acid sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 46.5% xylene. The solvent-free resin was pale reddish amber in color, slightly opaque, xylene-dispersible, and hard but not brittle in consistency, with a low melting point.

Example 10a

Para - secondary butylphenol (4.0 moles)
grams__ 600
Salicylic acid (1.0 mole) _____do____ 138
Formaldehyde 37% (5.0 moles) _____do____ 405
Xylene _____do____ 700
Dodecyl toluene monosulfonic acid sodium salt _____grams__ 3
HCl (concentrated) _____ml__ 40

The same procedure was followed as in Example 1a, preceding, except that the reflux period was 5 hours, instead instead of 1½ hours. Also, note the marked increase in amount of acid used as a catalyst in this instance.

The resin solution, so obtained, contained approximately 46.5% xylene. The solvent-free resin was amber in color, slightly opaque, and almost entirely soluble in xylene. It was fairly hard or pliable in consistency.

Example 11a

Menthylphenol (4.0 moles) _____ grams__ 923
Salicylic acid (1.0 mole) _____do____ 138
Formaldehyde 37% (5.0 moles) _____do____ 405
Xylene _____do____ 700
HCl (concentrated) _____ml__ 40
Dodecyl toluene monosulfonic acid sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 41.5% xylene. The solvent-free resin was deep red or reddish amber in color, clear, xylene-soluble, and pliable but not hard in consistency.

Example 12a

Para-tertiary octyl phenol (4.0 moles)
grams__ 824
Salicylic acid (1.0 mole) _____do____ 138
Formaldehyde 37% (5.0 moles) _____do____ 405
Xylene _____do____ 605
HCl (concentrated) _____ml__ 40
Dodecyl toluene monosulfonic acid sodium salt _____grams__ 3

The same procedure was followed as in Example 1a, preceding, except that the reflux period was 5 hours instead of 1½ hours. Also, note the marked increase in amount of acid used as a catalyst in this instance.

The resin solution, so obtained, contained approximately 38.8% xylene. The solvent-free resin was reddish amber in color, clear, xylene-soluble and semi-hard to pliable in consistency.

Example 13a

Para-tertiary amylphenol (3.0 moles)
grams__ 492
Salicylic acid (2.0 moles) _____do____ 276
Formaldehyde 37% (5.0 moles) _____do____ 405
Xylene _____do____ 700
HCl (concentrated) _____ml__ 40
Dodecyl toluene monosulfonic acid sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 48.8% xylene. The solvent-free resin was reddish amber in color, clear, xylene-soluble and semi-soft or pliable in consistency.

Example 14a

Para-secondary butylphenol (3.0 moles)
grams__ 450
Salicylic acid (2.0 moles) _____do____ 276
Formaldehyde 37% (5.0 moles) _____do____ 405
HCl (concentrated) _____ml__ 40
Xylene _____grams__ 700
Dodecyl toluene monosulfonic acid sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency.

Example 15a

Para-tertiary butylphenol (3.0 moles)
grams__ 450
Salicylic acid (2.0 moles) _____do____ 276
Formaldehyde 37% (5.0 moles) _____do____ 405
HCl (concentrated) _____ml__ 40
Xylene _____grams__ 700
Dodecyl toluene monosulfonic acid sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution contained approximately 44.2% xylene. The solvent-free resin was pale reddish amber in color, almost clear, and fairly hard or pliable in consistency.

*Example 16a*

| | | |
|---|---|---|
| Para-octylphenol (3.0 moles) | grams | 618 |
| Salicylic acid (2.0 moles) | do | 276 |
| Formaldehyde 37% | do | 405 |
| Xylene | do | 700 |
| HCl (concentrated) | ml | 40 |
| Dodecyl toluene monosulfonic acid sodium salt | grams | 3 |

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency.

*Example 17a*

| | | |
|---|---|---|
| Para-menthylphenol (3.0 moles) | grams | 696 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1a, preceding, except that the reflux period was 5 hours instead of 1½ hours. Also, note the marked increased in amount of acid used as a catalyst in this instance.

The resin solution, so obtained, contained approximately 40.3% xylene. The solvent-free resin was slightly softer in consistency than the resultant in Example 11a, preceding, but it had the same deep red or reddish amber color, and was clear, xylene-soluble and pliable but not hard.

*Example 18a*

| | | |
|---|---|---|
| Para - tertiary nonylphenol (3.0 moles) | grams | 660 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 41.2% xylene. The solvent-free resin was pale reddish amber in color, xylene-soluble, clear, and quite soft in consistency.

*Example 19a*

| | Grams |
|---|---|
| Para-tertiary amylphenol (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed the procedure was changed slightly from that employed in Example 1a. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water or slightly above, i. e., 100°-110° C., before distilling out water. The amount of water distilled out was 102 cc. Compare this procedure with that employed in Example 24a in Serial No. 8,723, filed February 16, 1948.

The resin solution, so obtained, contained approximately 41.2% xylene. The solvent-free resin was reddish black, clear, xylene-soluble and hard but not brittle in consistency.

*Example 20a*

| | Grams |
|---|---|
| Para-tertiary butylphenol (4.0 moles) | 600 |
| Salicylic acid (1.0 mole) | 138 |
| Propionaldehyde 96% (5.0 moles) | 305 |
| Sulfuric acid | 20 |
| Xylene | 700 |

The procedure followed was the same as that outlined in Example 19a, preceding. The resin solution, so obtained, contained approximately 42.6% xylene, and the solvent-free resin was reddish black in color, clear, hard and brittle, xylene-soluble, and had a melting point of about 82° C.

*Example 21a*

| | Grams |
|---|---|
| Para-secondary butylphenol (4.0 moles) | 600 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained approximately 42.6% xylene. The solvent-free resin was reddish black in color, clear and xylene-soluble. It was fairly hard to semi-pliable in consistency.

*Example 22a*

| | Grams |
|---|---|
| Para-octylphenol (4.0 moles) | 824 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained approximately 37.5% xylene. The solvent-free resin was dark amber in color, but clear and xylene-soluble, and hard but not brittle in consistency.

*Example 23a*

| | Grams |
|---|---|
| Menthylphenol (4.0 moles) | 928 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained about 35.6% xylene. The solvent-free resin was reddish black and clear, in color; xylene-soluble and fairly hard to semi-pliable in consistency.

Example 24a

| | Grams |
|---|---|
| Nonylphenol (4.0 moles) | 880 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained about 36.5% xylene. The solvent-free resin was reddish-black and clear in color; xylene-soluble and semi-hard to pliable in consistency.

In a number of cases phenols are simply designated as nonylphenol, etc., without specific designation of the position of substitution or the structure of the substituent radical. In such cases the phenols meant are either the commercial products distributed under these names, or, if the products are not commercially available, the products obtained by customary syntheses from phenol, meta-cresol, or 3,5-xylenol, and consist mainly of the para-substituted product, usually associated with some of the ortho-substituted product, perhaps a very small proportion of meta-substituted material, some impurities, etc. Also, it is to be understood that all of the products of the foregoing examples, unless it is otherwise stated in the example, are soluble in xylene, at least to an extent sufficient to permit the use of xylene as the solvent in oxyalkylation.

Attention is directed to the use of C–10 to C–14 substituted phenols. We have found these higher substituted phenols can replace an equivalent amount of the lower substituted phenols in any one of the proceding examples, using mixtures of salicylic acids and particularly phenols, in the same molar ratio, for instance, particularly Example 6a or 7a. In fact, particularly attractive mixed resins are obtained, using tetradecylphenol.

Difunctional tetradecylphenols are available at an attractive price. One grade of these particular phenols consists of a mixture representing about 90% para-substituted phenol, 5% ortho-substituted phenol, and 5% meta-substituted phenol. Although the same amount of meta-substituent is comparatively large compared with other difunctional phenols, it appears unobjectionable, due to the comparatively large side chain. For example, compare with the preparation of soluble thermoplastic phenols from cardanol, or side chain hydrogenated cardanol. One grade of this material is manufactured by the Oronite Chemical Company and designated as tetradecylphenol, grade 14–6069P. We have prepared resins from such phenol alone, or in admixture following the same procedure described in specific examples preceding. As a specific example, we have substituted this particular tetradecylphenol in Examples 6a, 7a, and 19a, and have obtained products, having similar characteristics, except that, if anything, the resins were somewhat darker and somewhat more fluid. Similarly, tetradecylphenol can be used with acetylene in combination with the other aldehydes described.

The use of the higher alkylated phenols, particularly decylphenol, dodecylphenol and tetradecylphenol, in the preparation of salicyclic acid containing resins is, of course, not limited to the use of such non-carboxy phenols alone, but one can, of course, make mixtures which give excellent results; for instance, one part of salicylic acid, two parts of para-tertiary amylphenol, and two parts of tetradecylphenol grade 14–6069P, previously described. In a similar mixture the amylphenol can be replaced by butylphenol, or octylphenol; likewise, in analogous mixtures the tetradecylphenol could be replaced by decylphenol or dodecylphenol. All of this is perfectly obvious in light of what has been said previously and requires no further description.

In the preceding examples the aldehydes used have been formaldehyde and propionaldehyde. Any aldehyde capable of forming a methylol or a substituted methylol group and having not more than 8 carbon atoms is satisfactory, so long as it does not possess some other functional group or structure which will conflict with the resinification reaction, or with the subsequent oxyalkylation of the resin, but the use of formaldehyde in its cheapest form of an aqueous solution, for the production of the resins, is particularly advantageous. Solid polymers of formaldehyde are more expensive and higher aldehydes are both less reactive and more expensive. Furthermore, the higher aldehydes may undergo other reactions which are not desirable, thus introducing difficulties into the resinification step. Thus, acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde on one hand, and a comparable product prepared from the same phenolic reactant and heptaldehyde on the other hand. The former, as shown in certain subsequent examples, is a hard, brittle, solid, whereas, the latter is soft and tacky, and obviously easier to handle in the subsequent oxyalkylation procedure.

There is a limit to the use of certain aldehydes, insofar that the herein described resins are obtained by the use of an acid catalyst. The use of furfural, in preparing phenolic resins, is generally limited to the use of an alkaline catalyst. Since alkaline catalysts would combine with the carboxyl of the salicylic acid radical, we have not found such modification desirable. When an acid catalyst is used, a furfural condensation is apt to take place. In any event, the selection of the aldehyde and a catalyst must be compatible with the use of the salicyclic acid, and for practical purposes, this seems to limit the method in a large measure to acid catalysts, such as those described. As is well known, resins of the kind herein described contain at least three phenolic nuclei. The resins herein described including use of salicyclic acid, are usually formed in the presence of a large amount of an acid catalyst. This means that the resin is apt to give more than three nuclei; in other words, an average of 4, 5, 5½ or 6 nuclei per resin molecule.

As pointed out in our aforementioned co-pending application Serial No. 8,723, other means are available to yield resins in which there may be present a larger number of phenolic nuclei, for instance, 7 to 15. Such resins are conveniently obtained by subjecting the resin obtained in the conventional manner to further treatment under a vacuum at a temperature below the pyrolytic point of the resin. Sometimes the expression "low-stage" resin or "low-stage" intermediate is employed to mean a stage having 6 to 7 units or even less. In the appended claims we have used "low-stage" to mean 3 to 7 units based on average molecular weight.

In the examples given we have found that the resin unit is apt to contain on the average of about 5 nuclei. For convenience, we have arbitrarily introduced either one or two moles of salicylic acid per resin unit. A larger number, for instance, 3 or 4, could be introduced, particularly if the resin unit were larger, for instance, contained 6 or 7 units. Such resins can be prepared at substantially higher temperatures, substituting cymene, tetralin, or some other suitable solvent which boils at a higher temperature instead of xylene, and increasing the amount of catalyst somewhat; for instance, doubling or tripling the quantity of catalyst. For practical purposes, our preference is a resin having approximately 4 to 5 phenolic units per resin molecule with 1 or 2 of such units being contributed by the salicylic acid radical.

Summarizing what has been said previously, it will be noted that these resins are "low-stage" resins, i. e., have 7 aromatic nuclei or less, and that there is always a plurality of alkylated phenol nuclei, in comparison with the salicylic acid nuclei, and preferably, not more than one unit is contributed by salicylic acid in a chain of a total of about 4 or 5 units. Needless to say, if one mixes one part of salicylic acid with three parts, four parts, or 3½ parts of an alkylated phenol, and produces a resin, one does not necessarily obtain a 4-unit, 5-unit, or 4- and 5-unit half-and-half mixture; but there are produced some 3-unit resin chains, some 4, some 5, some 6, and possibly a few 7-unit chains. The length of chain is, of course, based on molecular weight determinations, using either the freezing point depression, or boiling point rise. Such basis, of course, must be a statistical average, for reasons just noted. The outstanding type of resin is the oil-soluble resin having a total length equivalent to 4-to-6 phenolic nuclei, of which one, and only one, is salicylic acid.

As has been pointed out previously, one phase of the invention is concerned with the preparation of resins from salicylic acid and a difunctional monohydric hydrocarbon-substituted phenol, or phenols. In other words, there must be at least one difunctional phenol, such as butyl phenol, amyl phenol, hexyl phenol, octyl phenol, decyl phenol, dodecyl phenol, and salicylic acid, but one may employ a mixture, for instance, one mole of amyl phenol and one or more moles of butyl phenol, in combination with salicylic acid; or one mole of octyl phenol and one or more moles of nonyl phenol, in combination with salicylic acid; or one more of decyl phenol and one or more moles of dodecyl phenol, in combination with salicylic acid.

To avoid awkward and cumbersome terminology which may be confusing, reference in this application and in the claims to a "difunctional monohydric hydrocarbon-substituted phenol and salicylic acid" or equivalent language does not mean that one must use a single phenol, but, as pointed out, a mixture of such phenols is equally satisfactory. Similarly, the expression "non-carboxylated phenol," unless otherwise qualified, includes either a single non-carboxylated phenol, or a mixture of one or more non-carboxylated phenols.

Reference has been made to salicylic acid. The other isomer, para-hydroxy benzoic acid, would, of course, serve just as satisfactorily as salicylic acid, but it happens that para-hydroxy benzoic acid sells at several times as much per pound and seems to yield compounds which are of no increased value. For this reason, reference is made to salicylic acid, but it is obvious that the isomeric compound is the functional equivalent.

Having thus described our invention, what we claim as new and desire to secure by Letters Patent is:

1. A fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

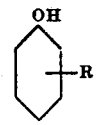

in which R is a hydrocarbon radical having at least 4 and not more than 14 carbon atoms and substituted in one of the positions ortho and para.

2. A fusible, carboxyl-containing, xylene-soluble, water-insoluble, low-stage phenol-aldehyde resin; said resin being derived by reaction between a mixture of a difunctional monohydric hydrocarbon - substituted phenol and salicylic acid on the one hand, and an aldehyde having not over 8 carbon atoms and having one functional group reactive towards both components of the mixture on the other hand; the amount of salicylic acid employed in relation to the non-carboxylated phenol being sufficient to contribute just one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

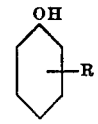

in which R is a hydrocarbon radical having at least 4 and not more than 14 carbon atoms and substituted in one of the positions ortho and para.

3. The resin of claim 2, wherein the initial mixture of phenolic reactants employed is within the ratio of 3 to 5 moles of alklylated phenol per mole of salicylic acid.

4. The resin of claim 2, wherein the initial mixture of phenolic reactants employed is within the ratio of 3 to 5 moles of alkylated phenol per mole of salicylic acid, and the aldehyde is formaldehyde.

5. The resin of claim 2, wherein the initial mixture of phenolic reactants employed is within the ratio of 3 to 5 moles of alkylated phenol per mole of salicylic acid, and the aldehyde is formaldehyde, wherein the phenol is para-tertiary butylphenol.

6. The resin of claim 2, wherein the initial mixture of phenolic reactants employed is within the ratio of 3 to 5 moles of alkylated phenol per mole of salicylic acid, and the aldehyde is formaldehyde, wherein the phenol is para-tertiary amylphenol.

7. The resin of claim 2, wherein the initial mixture of phenolic reactants employed is within the ratio of 3 to 5 moles of alkylated phenol per mole of salicylic acid, and the aldehyde is formaldehyde, wherein the phenol is para-tertiary nonylphenol.

MELVIN DE GROOTE.
BERNHARD KEISER.

No references cited.